(12) United States Patent
Boland

(10) Patent No.: US 6,269,390 B1
(45) Date of Patent: *Jul. 31, 2001

(54) AFFINITY SCHEDULING OF DATA WITHIN MULTI-PROCESSOR COMPUTER SYSTEMS

(75) Inventor: Vernon K. Boland, Lexington, SC (US)

(73) Assignee: NCR Corporation, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/767,763

(22) Filed: Dec. 17, 1996

(51) Int. Cl.$^7$ ........................................................ G06F 9/00
(52) U.S. Cl. ........................ 709/100; 709/102; 711/120; 711/121; 711/133
(58) Field of Search ....................................... 395/650, 200; 709/100, 102, 103, 104, 105, 106, 107; 711/118, 120, 121, 133, 141, 124

(56) References Cited

U.S. PATENT DOCUMENTS

| | | | |
|---|---|---|---|
| 5,185,861 | * 2/1993 | Valencia ............................. | 395/200 |
| 5,261,053 | * 11/1993 | Valencia ............................. | 395/200 |
| 5,287,508 | * 2/1994 | Hejna, Jr. et al. ................. | 395/650 |
| 5,317,738 | * 5/1994 | Cochcroft, Jr. et al. ........... | 395/650 |
| 5,437,032 | * 7/1995 | Wolf et al. .......................... | 395/650 |
| 5,872,972 | * 2/1999 | Boland et al. ...................... | 709/102 |

OTHER PUBLICATIONS

Overeinder et al. "A Dynamic Load Balancing System for Parallel Cluster computing" pp 101–115, May 1996.*
Michael J. Litzkow "Remote Unix Turning Idle Workstations into Cycle Servers" pp 301–304, May 1996.*
Radhika Thekkath and Susan J. Eggers—Impact of Sharing–Based Thread Placement on Multithread Architectures—IEEE, 1994.*

James Philbin, Suresh Jagannathan, Rajiv Mirani—Virtual Topologies: A New Concurrency Abstraction for High–Level Parallel Languages.*

James Philbin—An Overview of the Sting Operating System—NEC Software Conference, pp. 371–379, Dallas, Texas, Oct. 1992.*

* cited by examiner

Primary Examiner—Majid A. Banankhah
(74) Attorney, Agent, or Firm—James M. Stover

(57) ABSTRACT

An improved affinity scheduling system for assigning processes to processors within a multiprocessor computer system which includes a plurality of processors and cache memories associated with each processor. The affinity scheduler affinitizes processes to processors so that processes which frequently modify the same data are affined to the same local processor—the processor whose cache memory includes the data being modified by the processes. The scheduler monitors the scheduling and execution of processes to identify processes which frequently modify data residing in the cache memory of a non-local processor. When a process is identified which requires access to data residing in the cache memory of a non-local processor with greater frequency than the process requires access to data residing in the cache memory of its affined local processor, the affinity of the process is changed to the non-local processor.

3 Claims, 4 Drawing Sheets

AFFINITY SCHEDULING OF DATA WITHIN MULTI-PROCESSOR COMPUTER SYSTEMS

The present invention relates to multiprocessing systems and, more particularly, to a method for scheduling the execution of processes among processors within a multiprocessing system to minimize data transfers between processor cache memories and thereby improve the efficiency of the multiprocessing system.

BACKGROUND OF THE INVENTION

Historically, a major goal of multiprocessor (MP) computers has been to use the processors to collectively reduce the latency of jobs. This is particularly true of computationally intensive jobs in scientific applications which can often be parallelized across the multiple processors very efficiently. Even in commercial MP servers, much effort has been expended to make operating systems and applications "multi-threaded" so as to parallelize work across multiple processors, decreasing the latency of the computations. However, for MP computers serving hundreds or thousands of simultaneous users, the vast majority of jobs are not computationally intensive, and the throughput of the server, as well as the latency of the individual jobs, can best be achieved by giving the each individual job "affinity" to a given CPU, so that all of the instructions and data associated with the individual job can remain readily accessible in a local cache memory.

One such method of scheduling processes is disclosed in U.S. Pat. No. 5,185,861 to Valencia, issued Feb. 9, 1993, and entitled "Cache Affinity Scheduler". In that patent, an affinity scheduler for a multiprocessor computer system is disclosed. The affinity scheduler allocates processors to processes or jobs and schedules the processes to run based upon the bases of priority and processor availability. The scheduler uses the estimated amount of cache context to decide which run queue a process is to be enqueued. U.S. Pat. No. 5,185,861 is hereby incorporated by reference. Hereafter in this description, the method for allocating processors to processes will be referred to as a "process affinity scheduler", indicating that it is the user process (or "job" or "thread") that is given affinity to a processor.

It is believed that additional performance benefits can be gained by expanding the existing process affinity scheduler methods to encompass the idea of "data affinity scheduling", wherein data is given affinity to a processor and jobs or processes that are manipulating that data extensively should be run on that processor. To appreciate this performance opportunity, it must first be noted that only one processor within a multiprocessor system can be modifying a shared memory location at any given time in order to maintain memory coherency between the processors and various cache memories. When more than one user job is manipulating the same data, the data modified by a first job affinitized to a first processor (CPU A) must be transferred following modification to the second job affinitized to a second processor (CPU B). This transfer can be time consuming depending on the communication mechanism between the processors, the amount of data to be transferred, and the contention for the communication resource between the processors.

The assertion that data affinity increases performance, at least in certain applications, may seem counter-intuitive because computations on data that were previously done in parallel are now serialized. However, as the number of processors in a system increases, so does the communication and synchronization overhead between the processors. This overhead increase is independent of whether the communication mechanism is a shared bus, such as used by shared memory multiprocessor systems, or multiple interconnection paths, such as used by massively parallel processing (MPP) computers, because the contention for the interconnection path increases as the number of processors and the number of simultaneous users increase. Higher bus contention results in longer access latencies for transferring data blocks between processors. In addition, when the processes need to synchronize execution via a semaphore operation, the overhead of acquiring and releasing a lock cell is much greater when its memory cell is being "thrashed" between two processors. By running both synchronizing processes on the same processor, not only is greater performance obtained by caching the semaphore locally, but a code-path reduction is achieved since it is now impossible for both processes to be attempting to acquire the lock simultaneously. It is therefore believed that, for certain classes of jobs, there is a cross-over point where the latency of jobs will be SHORTER by running them in serial on a processor where they can share the common data and synchronization structures locally than it would be by running the jobs in parallel on different processors where the application and synchronization data must be transferred over the interconnection path between the processors.

OBJECTS OF THE INVENTION

It is therefore an object of the present invention to provide a new and useful method for scheduling tasks within a multiprocessor computer system to improve system performance.

It is another object of the present invention to provide such a scheduling method which assigns processes or tasks which manipulate the same data to the same processor within a multiprocessor system.

It is still a further object of the present invention to provide a new and useful affinity scheduler for a multiprocessor system, wherein data is given affinity to a processor and jobs or processes that are manipulating that data extensively are scheduled to run on that processor.

SUMMARY OF THE INVENTION

There is provided, in accordance with the present invention, a method for assigning processes to processors within a multiprocessor computer system which includes a plurality of processors and cache memories associated with each processor. The method affinitizes processes to processors so that processes which frequently modify the same data are affined to the same processor—the processor whose cache memory includes the data being modified by the processes.

In the described embodiment, the method of the present invention represents an improvement to a traditional affinity scheduling system wherein a process previously executed on a first processor within a multiprocessor computer system is affined to the first processor and will be scheduled for execution by the first processor during subsequent requests for execution of the process. The improvement comprising the steps of: (1) maintaining a count of the number of times the process requests access to the cache memory associated with the first processor; (2) maintaining a count of the number of times the process requests access to the cache memory associated with a second processor; and changing the affinity of the process from the first processor to the second processor when the count of the number of times the process requests access to the cache memory associated with the second processor exceeds the count of the number of times the process requests access to the cache memory associated with the first processor.

The above and other objects, features, and advantages of the present invention will become apparent from the following description and the attached drawings.

DETAILED DESCRIPTION OF THE PREFERRED EMBODIMENT

Figure 1:
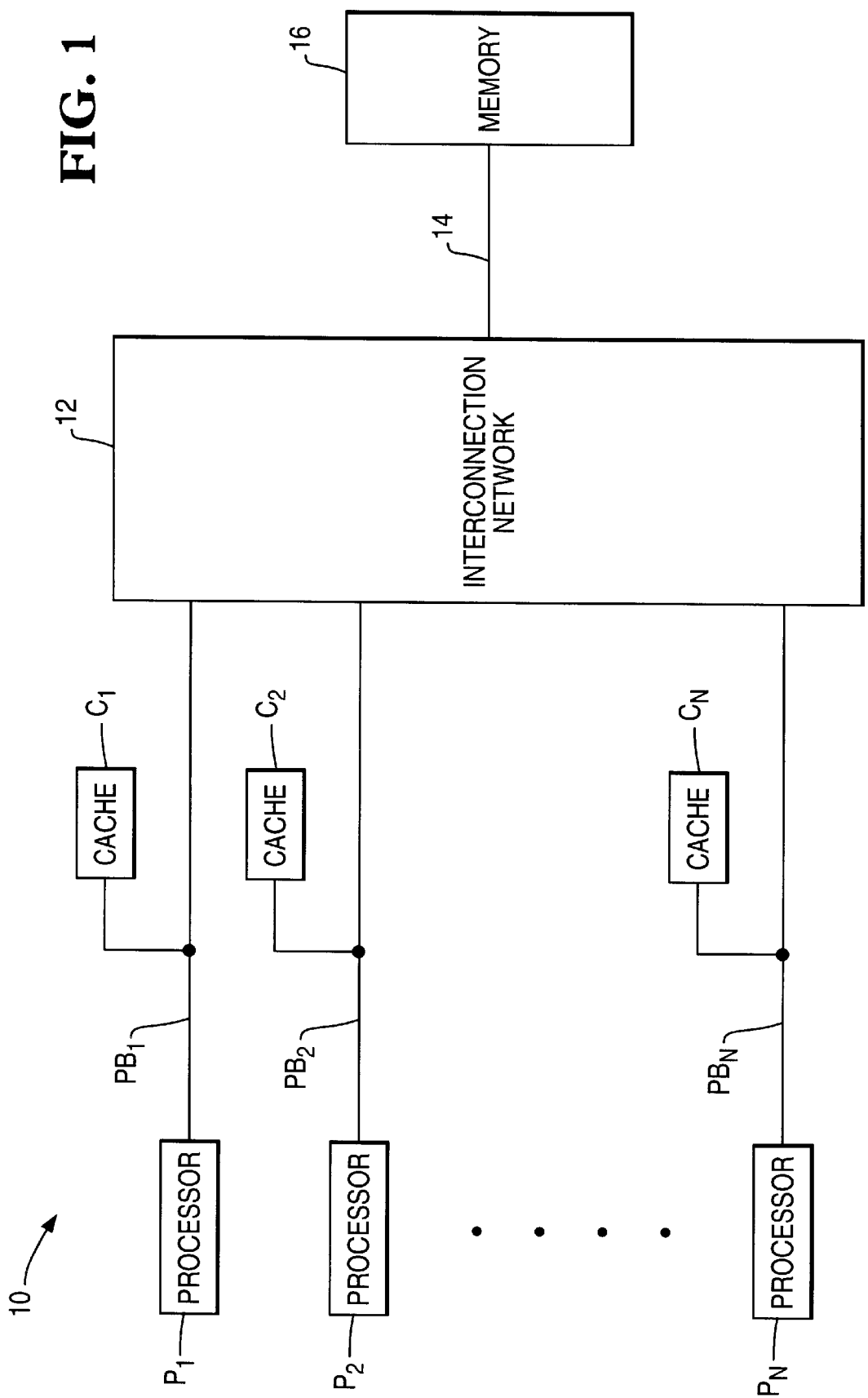
FIG. 1 is a simplified block diagram of a computer system having P processors.

Referring now to FIG. 1, a representative computer system 10 having multiple processors $P_1$ through $P_N$ is shown. Each of the processors $P_1$ through $P_N$ has a respective cache memory $C_1$ through $C_N$ attached thereto. Each of the processors $P_1$ through $P_N$ is connect via a respective processor bus $PB_1$ through $PB_N$ to a system interconnect network 12, for example a parallel system bus. The interconnect network 12 is also connected to a common system memory 16 via a memory bus 14. The common memory 16 may be accessed by any of the processors $P_1$ through $P_N$ via the interconnect network 12.

The advantages offered by the use of cache memories to improve system speed, allowing processors to operate effectively at the faster speed of the cache memory rather than at the slower speed of a conventional DRAM main memory, are well known A cache memory provides information to its associated processor faster than main memory, thus improving read cycles. Write cycles are also improved as a cache memory receives information from its associated processor at a fast rate, allowing the processor to continue processing while the cache independently processes the write to main memory as needed. The use of cache memories within a multi-processor system, however, provides additional advantages. System performance is improved through more efficient utilization of the memory or system buses. Traffic on the memory bus is reduced. Each data read and write operation need not involve main memory, rather data can be exchanged between the cache and main memory when convenient through the execution of burst cycles.

The system 10, unless preventive measures are taken, will be prone to random process migration.

A block diagram illustrating the major elements of an affinity scheduler utilized within a multiprocessor system, such as the system described above, is provided in FIG. 2. Scheduler 22 schedules all runnable processes in global run queue 24, including new processes as well as processes which have been previously run and are now affinitized to a specific processor. These processes may thereafter be reordered based upon process priority within a global priority run queue 26. Within priority levels processes are placed in a first-in-first-out (FIFO) order.

During operation, each processor, when it becomes available, will consult the global priority run queue 26 to determine which process it will next execute. One known affinity scheduling procedure for determining process execution is illustrated in the flow diagram of FIG. 3.

Figure 3:
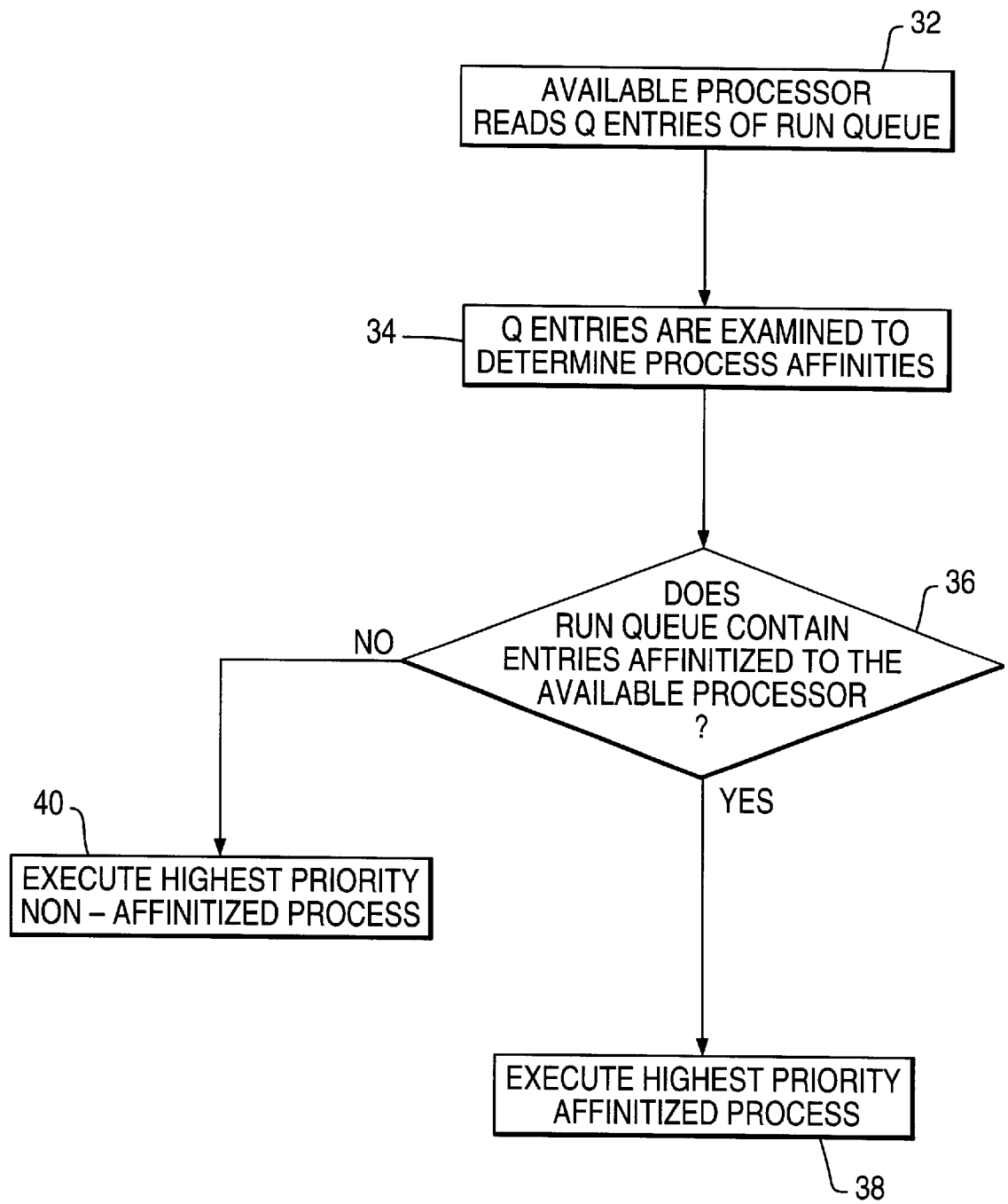
FIG. 3 is a flow diagram showing a method of operating an affinity scheduler without application of the present invention.

Referring now to FIG. 3, as a processor $P_1$–$P_N$ becomes available to receive and execute another process, it reads the queue entries contained within global priority run queue 26 (step 32). Each previously executed process entered into the global priority run contains information identifying the processor to which the process is affinitized. The queue entries read during step 32 are examined to identify processes affinitized to the available processor (step 34). If one or more of the entries read from the run queue is determined to be affinitized to the available processor then the highest priority entry identified as affinitized to the processor will be executed by that processor (steps 36 and 38). If no entries are determined to be affinitized to the processor then the highest priority non-affinitized process identified in run queue 26 will be executed (steps 36 and 40). This highest priority non-affinitized process may be a new process or a process affinitized to another processor, in which case the process will yield its affinity to the other processor and be "stolen" by the available processor.

The present invention provides a method whereby data is given affinity to a processor, and jobs that are manipulating that data extensively are run on that processor. Two examples of how data affinity can be identified so that jobs manipulating common data can be run on the same processor are described below. The first example presents a mechanism for a multi-threaded database engine to identify threads that are modifying the same data buffers and schedule them to run on the same processor. The second example presents a mechanism for an operating system to identify communication processes that are manipulating common data streams and to schedule them to run on the same processor.

Multi-Threaded Database Engines:

In a Multi-Threaded Database Engine, each "thread" of execution represents a task to be performed by the database on behalf of a user. Frequently, two or more threads will need to update the same database pages during the a common time window. For Symmetric Multi-Processor (SMP) computers, a great performance benefit could result from running these threads on the same processor. In doing so, the data used by these processes can be accessed quickly from a local cache instead of being transferred across system buses between different processors. Described herein is a method for automatically identifying processes that are modifying the same data pages, and migrating the processes to run on the same processor. In addition to the benefit of fast access to common data, another benefit is realized from running these threads on the same processor: lock contention for the data page is greatly reduced. This reduction of lock contention is due to the fact that the data accesses are now serialized by virtue of the fact that the threads are running on the same processor. When this is not the case, the various processors may simultaneously contend for the same lock cell to be able to update the data page.

Figure 2:
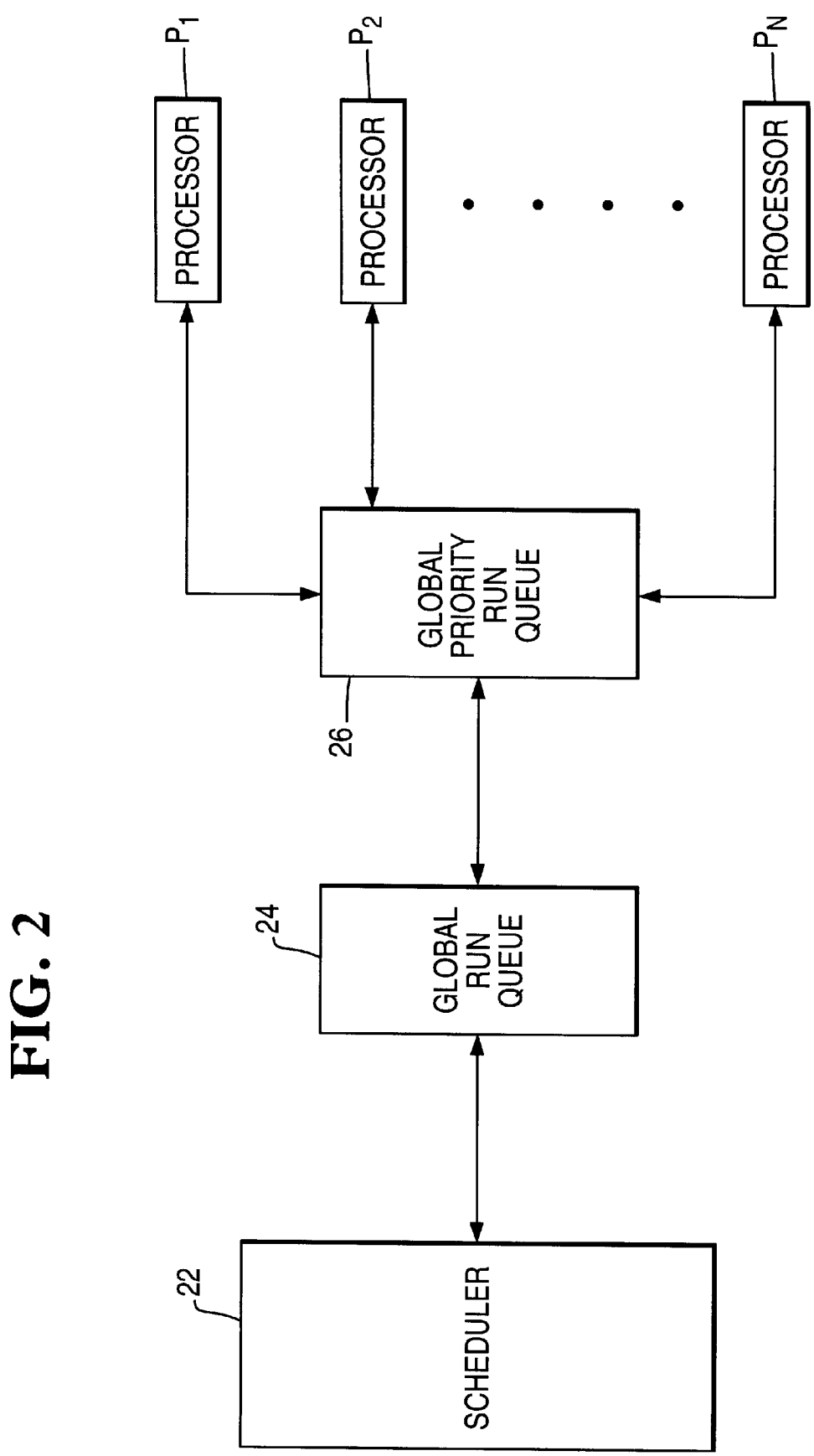
FIG. 2 is a simplified block diagram illustrating the major elements of an affinity scheduler utilized within a multiprocessor system, such as the system of FIG. 1.

The method for automatically identifying processes that are modifying the same data pages, and migrating the processes to run on the same processor described herein assumes that a per-processor affinity scheduler, such as the scheduler shown in FIGS. 2 and 3 and discussed briefly above, ensures that threads in general will execute on the same processor for long periods of time. In order to fully describe the invention, some of the data structures must first be described. It is assumed that the database manages its data buffers as an LRU (least recently used) chain of buffer structures. Three additional fields; identified as next_lrm, prev_lrm, and local_cpu; will be added to the LRU structure as shown in the pseudo code which follows:

```
struct buffer {
    < database specific members >
    struct buffer    *next_lrm
    struct buffer    *prev_lrm;
    int              local_cpu;
}
```

Figure 4:
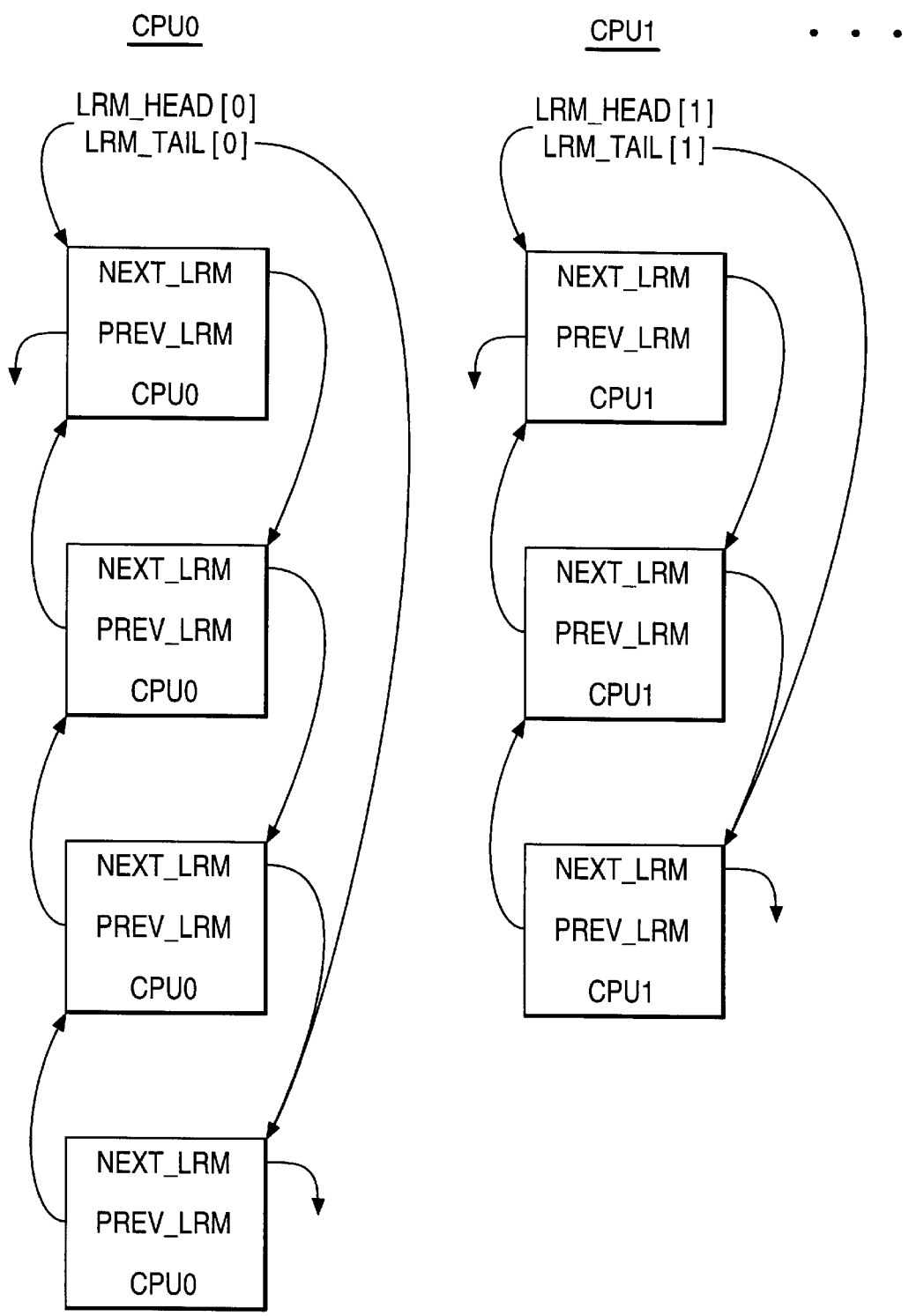
FIG. 4 is a simple block diagram illustration of an LRU (Least Recently Used) chain of buffer structures for each processor within a multiprocessor system which is added to the system's scheduling algorithm to accomplish data affinity scheduling in accordance with the present invention.

The new next_lrm and prev_lrm fields are used to link the buffers into N new linked lists called LRM lists, where N is the number of processors, and LRM stands for "Least Recently Modified". A simple block diagram illustration of an LRU (Least Recently Used) chain of buffer structures for each processor within a multiprocessor system is shown in FIG. 4. These lists also include arrays of head and tail pointers as follows:

struct buffer *lrm_head[N];
    struct buffer *lrm_tail[N];

In each of these lrm lists, the local_cpu field would match the index of the lrm_head and lrm_tail arrays to which they belonged. Additional members to the thread structure of the database which are required are as follows:

```
struct thread {
    <database specific members >
    int local_write_count;
    int remote_cpu_id;
    int remote_cpu_write_count;
    int local_cpu_affinity;
}
```

It is assumed that when a new thread is created, it is assigned or claimed by a processor which then sets the local_cpu_affinity field.

Given these data structures, threads which update common data pages can be detected by adding code to the database's buffer handling routines in the following three cases:

1. Write to an unmodified buffer already in the LRU chain. In this case, the buffer would be linked to the head of the lrm head[cpu_id] structure, where cpu_id is the id of the processor currently executing the thread, and the local_write_count field of the thread structure would be incremented by one.
2. Write to a modified buffer already in the LRU chain. If the buffer is already in the lrm-head[cpu_id] list, then increment the local_write_count field of the thread structure by one and move the buffer to the head of the lrm_head[cpu_id] list. Otherwise, the buffer is in the lrm-head[ ] list of a different processor. In this case, the function cross_buffer_update(buffer, cpu id) (described below) is called and the position of the buffer in the other processor's lrm_head list is not changed.
3. Read of a buffer not in the LRU chain. In this case, the currently executing thread must initiate a request to the operating system to read the buffer from disk and go to sleep. Since it will be temporarily removing its thread structure from the list of currently active threads, this is a good place to change its thread affinity. Here the local_write_count and remote_cpu_write_count fields of the thread structure are evaluated. If remote_cpu_write count is greater than local_write_count, then before going to sleep, the local_cpu_affinity field is changed to remote-cpu-id, and remote_cpu_id and remote_cpu_write_count are reset.

Of course, the LRU chains would have a maximum size, and any addition that would exceed this size must first remove the tail buffer and nullify its local_cpu field. The behavior of the cross_buffer_update function is given in the pseudo code shown below:

```
cross_buffer_update(struct buffer* buf, int cpu_id) {
    if (current_thread->remote_cpu_id==buf->local_cpu)
        current thread->remote cpu write count++;
    else if (current thread->remote cpu write count<=0
        ||current_thread->remote_cpu_id==NULL) {
        current thread->remote cpu write count=1;
        current_thread->remote_cpu_id=buf->local_cpu;
    }
    else
        current_thread->remote_cpu_write_count - - ;
}
```

The intent of this code is to identify the remote processor to which the most writing is occurring.

By keeping per-processor LRU lists, the data buffers that the threads running on that processor are modifying regularly can be identified. By adding count logic to the thread structures, the threads that are modifying pages on another processor more frequently than those on their local processor can be identified. In this condition, the affinity of these threads can be moved to the remote CPUs at a convenient time (wakeup from sleep).

Multi-Media Communication Servers:

A multi-media communication server may be defined as a computer system (hardware+software) designed to handle the processing constraints of isochronous service of video and audio communication channels. The constraints of isochronous service of video and audio data implies that all of the computer system (network, system bus, memory, disk subsystem, and operating system) must be able to guarantee a slice of bandwidth at fixed delays between successive transmissions of the data. For a non-dedicated server, i.e., one that can also process other types of jobs, this requirement implies an interrupt-driven scheduling paradigm for the isochronous data. Normal processing could occur until an interrupt for the isochronous data has arrived. At this point, a high priority process would be spawned which would immediately take the necessary processing bandwidth needed to handle the processing requirements within the time limit. Any time remaining between the termination of the interrupt processing and the arrival of the next interrupt could again be used for the processing of other types of jobs.

As applications for this field continue to emerge, there is a growing need to merge data streams and/or to perform multiple tasks on the same data stream. Examples of such tasks include: data compression of video/audio, language recognition/translation of audio and database operations of the video/audio objects. As will be discussed below, for multi-processing computer systems handling hundreds or thousands of connections, there is a point at which it is more efficient NOT to parallelize these tasks to several processors, but to serialize them on the same processor in order to keep the relevant data cached locally to the processor. Note that this premise assumes that the computation can be completed on a single processor within the time window of the isochronous interrupts. Since the video/audio data streams are connection oriented, the operating system could be modified in such a way that the interrupt handling code for the isochronous interrupt determines the connection ID of the incoming data, and assigns that data stream (or connection ID or port) affinity to a particular processor. Thereby, any jobs spawned off to process the data associated with that data stream could be affinitized to its specified processor. Thus the data stream has affinity to a processor, and the operating system affinitizes jobs processing that data to that processor at its discretion. The interrupt driver must necessarily have knowledge of the bandwidth capability of the processor and the processing bandwidth requirements of the jobs affinitized to the processor in order to verify that enough guaranteed bandwidth is available prior to accepting any new connection requests.

SUMMARY

It can thus be seen that there has been provided by the present invention a new and useful method for scheduling tasks within a multiprocessor computer system which, for certain applications, can greatly improve system performance. The described affinity scheduling method affinitizes data to a processor within the multiprocessing system, and jobs or processes that are manipulating that data extensively are thereafter scheduled to run on that processor.

Although the presently preferred embodiment of the invention has been described, it will be understood that various changes may be made within the scope of the appended claims.

What is claimed is:

1. An improved process scheduling method for a multiprocessor computer system, said multiprocessor system including a plurality of processors, each processor including a cache memory associated therewith, said improved affinity process scheduling method comprising the steps of:

monitoring a process being executed on a first processor within said multiprocessor system and determining for said process a cache memory associated with a second processor within said multiprocessor system containing data which is frequently being manipulated by said process; and scheduling subsequent executions of said process on said second processor.

2. In a multiprocessor computer system including a plurality of processors, each processor including a cache memory associated therewith, and employing an affinity process scheduling method whereby a process previously executed on a first processor within said computer system is affined to said first processor and will be scheduled for execution by said first processor during a subsequent request for execution of said process, an improvement to said affinity process scheduling method, said improvement comprising the steps of:

maintaining a count of the number of times said process requests access to the cache memory associated with said first processor;

maintaining a count of the number of times said process requests access to the cache memory associated with a second processor;

changing the affinity of said process from said first processor to said second processor when the count of the number of times said process requests access to the cache memory associated with said second processor exceeds the count of the number of times said process requests access to the cache memory associated with said first processor.

3. An affinity process scheduling method for a multiprocessor computer system, said multiprocessor computer system including a plurality of processors, each processor including a cache memory associated therewith, said affinity process scheduling method comprising the step of:

assigning processes to processors within said multiprocessor computer system for execution, each process being affined to a first processor so that subsequent executions of said process are scheduled for execution on said first processor; and monitoring the scheduling and execution of said process and determining for said process a cache memory associated with a second processor containing data frequently being manipulated by said process; and changing the affinity of said process to said second processor so that subsequent executions of said process are scheduled on said second processor associated with said cache memory containing data frequently being manipulated by said process.

* * * * *